United States Patent
Whittemore

[15] 3,659,079
[45] Apr. 25, 1972

[54] ELECTRICALLY HEATED WINDOW
[72] Inventor: Russell G. Whittemore, Pittsburgh, Pa.
[73] Assignee: PPG Industries, Inc., Pittsburgh, Pa.
[22] Filed: Apr. 27, 1971
[21] Appl. No.: 137,899

[52] U.S. Cl. ............................ 219/522, 219/203, 219/543, 338/211, 338/217, 338/309
[51] Int. Cl. ...................................................... H05b 3/06
[58] Field of Search .......... 219/203, 522, 543, 549, 211–212; 338/217, 308, 309

[56] References Cited

UNITED STATES PATENTS

| | | | |
|---|---|---|---|
| 2,557,983 | 6/1943 | Linder | 219/543 |
| 2,569,773 | 10/1951 | Orr | 219/543 |
| 2,648,752 | 8/1953 | Saunders | 338/217 X |
| 2,648,754 | 8/1953 | Lytle | 219/543 X |
| 2,710,900 | 6/1955 | Linder | 219/543 |
| 2,877,329 | 3/1959 | Gaiser | 338/309 |
| 2,993,815 | 7/1961 | Treptow | 338/308 X |
| 3,302,002 | 1/1967 | Warren | 219/543 |
| 3,287,684 | 11/1966 | Armbruster, Jr. | 338/211 |
| 3,325,763 | 6/1967 | Casey | 338/309 |
| 3,467,818 | 9/1969 | Ballentine | 219/522 |

Primary Examiner—Volodymyr Y. Mayewsky
Attorney—Chisholm & Spencer

[57] ABSTRACT

A heated window having bus bars of non-uniform width interconnected by spaced electroconductive members to form a heating circuit. The center portions of the bus bars, which are adapted for connection to a power source, are of greater width than their end portions to minimize bus bar heating when the heating circuit is energized to remove mist or frost from the window.

8 Claims, 3 Drawing Figures

PATENTED APR 25 1972 3,659,079
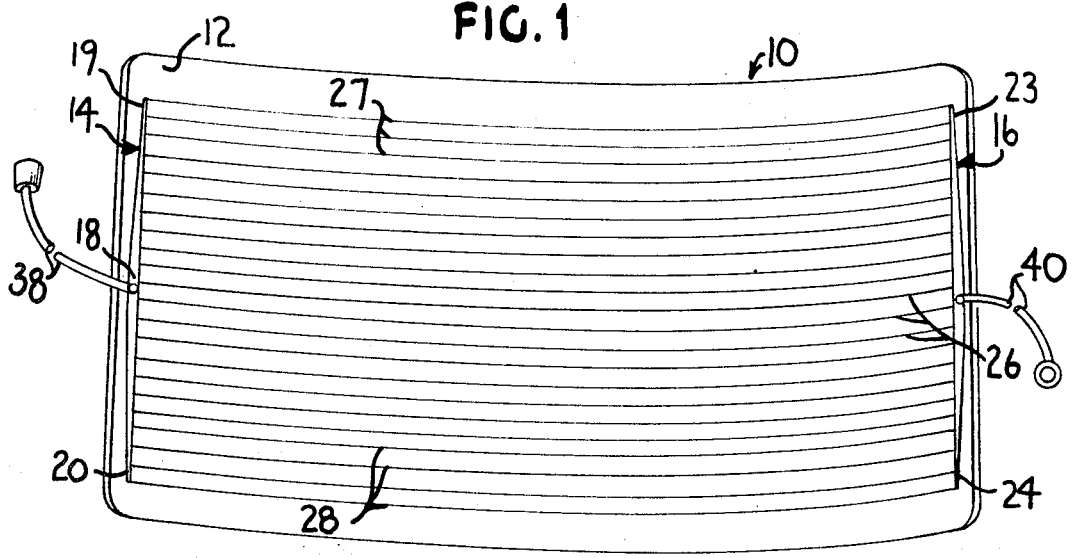
FIG. 1
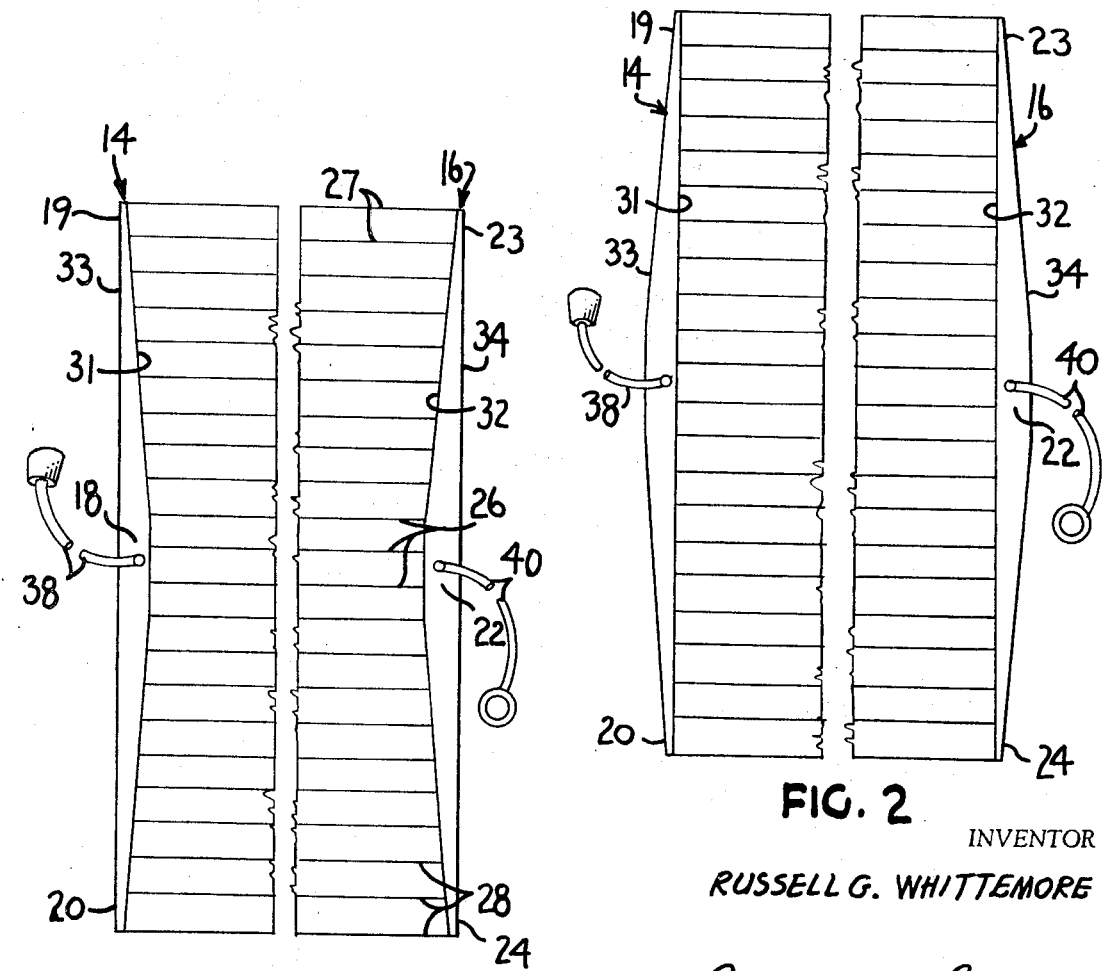
FIG. 3
FIG. 2
INVENTOR
RUSSELL G. WHITTEMORE
BY *Chisholm & Spencer*
ATTORNEYS

ELECTRICALLY HEATED WINDOW

BACKGROUND OF THE INVENTION

1. Field of the Invention

The present invention relates to windows having electroconductive circuits rigidly attached thereto, particularly to windows suitable as backlights for automobiles. The need to remove frost or mist by electroconductive heating from a window of an automobile that has been left parking outdoors overnight is well known.

The deposit of moisture and ice on an automobile window has annoyed automobile owners considerably. Automobiles that are parked overnight are dangerous to drive until visibility is attained by removing the moisture deposit. In the past, this removal has been accomplished by applying a squeege or scraper to the fogged surface of the window to improve the visibility through the window before moving the vehicle in traffic. Hot air blowers have also been employed to blow hot air across the surface of a fogged window. However, time is required to heat the air that is blown across the surface of the window to a temperature that is sufficient for the hot air to perform efficiently its defogging or deicing function.

In addition, the inner surface of automobile windows tends to fog whenever the windows are closed and moisture from the breath of occupants condenses on their inner surfaces. This source of fogging has also been difficult to remedy by the prior art devices described above.

Resistance wires have been attached to the surface of monolithic glass sheets or laminated glass plastic windows or embedded within a plastic interlayer of laminated windows to heat the window by passing electric current through the resistance wires connected between spaced bus bars. When a potential difference is applied between the bus bars, the heating wires convert the electric energy into sufficient heat energy to defog or deice the window as required.

Aircraft windows are usually coated with a transparent electroconductive coating of a metal oxide such as tin oxide or the like. This coating has a high electrical resistance requiring about 150 volts minimum potential difference to clear a window having a size comparable to that of an automobile windshield. In addition, tin oxide coatings, to be sufficiently electroconductive to function in the desired manner, are of iridescent thickness. This iridescence is annoying to an observer. Furthermore, considerable difficulty exists in obtaining suitable electrical contact between the bus bars, which are usually of a finely divided ceramic silver material, and the transparent electroconductive metal oxide film, which usually contains tin oxide and additives that enhance its electroconductivity.

Automobiles are currently provided with a 12-volt electrical energy system and the bus bars used in electroconductive heating circuits must be of limited thickness to adhere to a glass surface. Heretofore, automobile stylists have limited the width of such bus bars to about ¼ inch in automobile backlights. Since the ceramic silver bus bar materials have so much electrical resistivity in the thicknesses and widths at which they are applied, when they furnish sufficient electrical current to the heating wires to enable the latter to defog a clouded window in a reasonable time, the bus bars overheat.

One method of avoiding overheating the bus bars involves widening or thickening the latter to improve their conductivity. Wider bus bars have been rejected by automobile stylists. Thicker bus bars are impractical because their adhesion to glass weakens with increased thickness.

Until recently, the automobile industry has not accepted windows provided with spaced, elongated stripes of electroconductive material interconnected between bus bars mounted adjacent the opposite edges of the window and formed of the same material because of the above-described limitations of the 12-volt electrical system. However, if some way could have been found to make such a circuit practical to use and acceptable to automobile stylists, it would have been used because bus bars and stripes can be applied simultaneously by a silk screening method of the type normally employed in the aircraft industry for applying ceramic silver bus bars. A typical example of such a method of application of ceramic silver is found in U.S. Pat. No. 2,648,754 to William O. Lytle. Such a method provides a pattern of ceramic silver material of uniform thickness.

It has been found, however, that when a lead-in wire leading to a battery terminal is connected to one of the bus bars and a grounded connection with the automotive body is connected to the other bus bar at one place only on each bus bar, that the 12-volt system is inadequate for reasons explained above to clear a window of condensed moisture in a reasonable time. Since the ceramic silver mixture used as the resistance material for the bus bars and the electroconductive strips is an expensive material, it is economically unfeasible to apply this material very thickly. In addition, the adhesion of ceramic silver to glass deteriorates when the ceramic silver layer is too thick.

It has been proposed to extend the lead-in wires, which are usually made of braided copper, over the entire length of the bus bars to provide a continuous elongated area of electrical contact between the lead-in wires and the bus bars. However, differences in thermal expansion and contraction during use develop stresses which break the contact between the lead-in wire and the bus bars.

It is impractical to use copper wire for the bus bars and the elongated resistance heating stripes because of the difficulty of adhering such material to a glass surface. It is equally impractical to use the ceramic silver as a lead-in wire, because the latter is very brittle.

2. Description of the Prior Art

U.S. Pat. No. 2,648,752 to Saunders discloses a transparent electroconductive panel having a continuous film of transparent electroconductive metal oxide interconnecting a pair of bus bars of electroconductive material extending along opposite edges of the coated sheet. Portions of the film extending between the opposite facing ends of the bus bars are either uncoated or are locally less conductive than the main portion of the film. This provision avoids excessive current flow at the ends of the bus bars, which excessive current flow is associated with excessive stresses in the glass.

U.S. Pat. No. 2,710,900 to Linder discloses a coated glass sheet having a pair of spaced bus bars interconnected by a continuous film of transparent electroconductive material and electroconductive areas of higher electroconductivity than the film spaced intermediate the bus bars and in electric contact with the electroconductive film. The purpose of the Linder arrangement is to equalize the flow of current from bus bar to bus bar along the entire length thereof.

U.S. Pat. No. 2,877,329 to Gaiser discloses a transparent electroconductive film interconnected between two bus bars whose thickness varies from one end to the other in approximate proportion to the distance between the bus bars. This patent also tends to provide uniformity of conductivity throughout the entire area of the article.

U.S. Pat. No. 2,993,815 to Treptow discloses a partially coated refractory substrate having a pair of bus bars arranged in reversed "E" shaped patterns. The fingers of each "E" pattern extend between the fingers of the other pattern in spaced relation to one another. The bus bars for each set of fingers have straight parallel inner edges and convex rounded outer edges. The printed circuit disclosed in this patent does not provide a continuous resistance circuit between the bus bars.

U.S. Pat. No. 3,302,002 to Warren provides a segmented bus bar wherein each segment has a configuration of changing cross section area from one end of the segment to the other end of the segment. The arrangement of the segments is so chosen as to provide a uniformity heating conductivity panel. The bus bars segments are tapered in a "saw tooth" looking pattern.

U.S. Pat. No. 3,287,684 to Armbruster discloses in FIG. 5 tapered bus bars having a wide end portion of each bus bar connected to an exterior lead. The bus bars are tapered to provide a current distribution equally along the lengths of the bus bars. The wide part of the bus bar enables more current to be carried with the same rate of wattage dissipation as the narrow end of the bus bars so that the entire surface generates heat including the bus bars as well as the rest of the material between the bus bars.

U.S. Pat. No. 3,467,818 to John P. Ballentine, assigned to PPG Industries, Inc., suggests extending a lead-in wire loosely over the entire length of each bus bar and providing a plurality of spaced connections, such as solder connections, between the lead-in wires and the bus bars so that the lead-in wires extend loosely between the spaced connections to compensate for the difference in thermal expansion between each lead-in wire and its aligned bus bar resulting from changes in temperature of the window during its use, particularly when current is applied to heat a fogged window.

The provision of a plurality of spaced solder connections increases the cost of manufacturing heated windows tremendously. The present invention is based on a novel bus bar construction that enables a standard 12-volt battery used in automobiles to clear the center portion of an automobile rear window in a reasonable time without requiring a plurality of solder connections for each bus bar.

SUMMARY OF THE INVENTION

The present invention suggests providing bus bars of uniform thickness extending adjacent the opposite end edges of a window having their center portions of greater width than their end portions. Each relatively wide central portion is provided with a single connection to one or the other of a pair of lead lines, thus avoiding the expense necessitated by the multiple solder connections of U.S. Pat. No. 3,467,818 to Ballentine.

In a preferred embodiment of the present invention, the conductivity per unit length of the bus bar adjacent its connection to a lead line is at least 20 times that of each resistance element interconnecting the bus bars but less than 8 times that of each resistance element at the end portions of the bus bars. In this manner, the conventional 12-volt battery system of an automobile is capable of providing a center vision area of sufficient size to enable a motorist to have adequate rear vision without overheating the bus bars or having bus bars so wide throughout their length that they offend auto stylists.

BRIEF DESCRIPTION OF THE DRAWINGS

The present invention will be understood more clearly after one studies a description of a preferred, illustrative embodiment and certain variations thereof that follows. In the drawings which form part of the aforesaid description and wherein like reference numbers refer to like structural elements, FIG. 1 is a plan view of an automobile backlight supporting a heating circuit comprising bus bars constructed according to the present invention interconnected by spaced electroconductive members and FIGS. 2 and 3 are enlarged, fragmentary views of two illustrative embodiments of the present invention.

Referring to the drawings, a curved automobile backlight 10 is shown in FIG. 1 having a surface 12 that is the inward facing surface of the curved backlight when installed in a vehicle. The surface 12 is generally concavely curved.

Superimposed on surface 12 and extending generally along and adjacent to the opposite end edges thereof are elongated bus bars 14 and 16. Bus bar 14 has a greater width in its center portion 18 than in its end portions 19 and 20. Bus bar 16 has a center portion 22 opposite center portion 18 of bus bar 14 and one end portion 23 facing the one end portion 19 of bus bar 14 and another end portion 24 facing the other end portion 20 of bus bar 14. Like the center section 18 of bus bar 14, the center portion 22 of bus bar 16 is wider than either end portion 23 or 24.

The bus bars are arranged as mirror images of one another and extend substantially parallel in adjacent relationship to the opposite end edges of the backlight 10. A plurality of electroconductive members 26, 27 and 28 extend in substantially equally spaced relationship from bus bar 14 to bus bar 16. Electroconductive members 26 extend between the corresponding relatively wide central bus bar portions 18 and 22. Electroconductive members 27 extend between the one end portion 19 of bus bar 18 and the corresponding end portion 23 of bus bar 16. In addition, electroconductive members 28 extend between the opposite other end portion 20 of bus bar 14 and the other end portion 24 of bus bar 16.

In a commercial embodiment of the invention, the resistance heating elements 26, 27 and 28 and the bus bars 14 and 16 are formed of a typical electroconductive coating material comprising a highly conductive metal powder, such as silver, and a vitrifying binder. Typical ceramic conductive coating compositions which may be used may have the following compositions:

COMPOSITION I

| Ingredient: | Percent by weight |
| --- | --- |
| PbO | 7.5 |
| $B_2O_3$ | 1.0 |
| $SiO_2$ | 1.5 |
| Flake Silver | 70.0 |
| French fat oil | 12.5 |
| Turpentine | 7.5 |

COMPOSITION II

| Ingredient: | Percent by weight |
| --- | --- |
| Finely divided silver | 72.6 |
| PbO | 9.3 |
| $SiO_2$ | 1.7 |
| $B_2O_3$ | 1.4 |
| $H_2O$ | 7.5 |
| Ethyl alcohol | 7.5 |

COMPOSITION III

A typical commercial composition is a mixture containing 90 percent by weight of a ceramic silver composition sold under the trade name AB Silver by the O'Hommell Company of Carnegie, Pa., and 10 percent of a non-conducting mixture of metallic oxides sold under the trade name K736 Black by the Ferro Corporation of Cleveland, Ohio.

The electroconductive members 26, 27 and 28 form narrow lines approximately 1/32 inch wide and 45 to 60 inches long, depending on the size of the backlight. The bus bars 14 and 16 are preferably ⅝ inch to 1 inch wide at their center portions 18 and 22 respectively. The wide center portions are about 3-½ inches long and are provided with means adapted for connection to a power source, preferably a solder connection as close as possible to the geographical center of the relatively wide central section of each bus bar. The end portions 19 and 20 of bus bar 14 and the corresponding end portions 23 and 24 of bus bar 16 taper in width from the relatively wide width at the ends of the center sections 18 and 22 respectively to a width of ¼ inch at the ends. The taper in width is desirable for styling purposes.

According to one embodiment of the invention as depicted in FIG. 2, the inner end 31 of bus bar 14 is straight and faces toward the straight inner end 32 of bus bar 16. The inner ends 31 and 32 are parallel. In an alternate embodiment of the invention depicted in FIG. 3, the outer end 33 of bus bar 14 and the outer end 34 of bus bar 16, which outer ends face away from one another, are straight and generally parallel to one another. The variance in width is obtained in each of the aforesaid embodiments by sloping the opposite edge from the straight edge to provide the tapered width desired.

In either embodiment, provision is made for attaching a lead line 38 to the center of the central portion 18 of the bus bar 14 and another lead line 40 to the center of the central portion 22 of bus bar 16. The lead line connections are preferably approximately equidistant from the points where adjacent electroconductive members 26 connect to the bus bars.

It is also suitable to have both inner and outer edges of the bus bar extending oblique to taper the width of the bus bars from the center portion 18 or 22 to the one corresponding end portion 19 or 23 and the other corresponding end portion 20 or 24 in the event styling dictates.

EXAMPLES

The typical commercial composition comprising a mixture containing 90 percent by weight of a ceramic silver composition sold under the trade name of AB Silver by the O'Hommell Company of Carnegie, Pa. and 10 percent of a nonconducting mixture of metallic oxides sold under the trade name of K736 Black by the Ferro Corporation of Cleveland, Ohio was applied through a stencil to form 22 electroconductive members 26, 27 and 28 about 1/32 inch wide and about 1-¼ inch apart and bus bars 14 and 16 having a 3-½ inch long center section one inch wide tapering to ¼ inch width at the ends. The coated glass sheet was then gripped by a pair of glass engaging tongs suspended from an overhead carriage. The tong-suspended glass sheet was then introduced into a furnace where the glass was heated to its deformation temperature (in this case about 1,200 degrees Fahrenheit). During this heating, the finely divided metal frit fused onto the glass surface 12. The heat softened glass was then sandwiched between a pair of press bending molds immediately outside the furnace and then chilled as rapidly as possible to produce a tempered glass sheet.

Lead-in wires 38 and 40 were connected to the center portions 18 and 22 of bus bars 14 and 16, respectively, approximately midway between the lines of connection to adjacent centrally disposed electroconductive members 26. These connections were solder connections and served as means adapted to connect the bus bars to a power source through lead wires 38 and 40.

Preferably, the lead-in wire is a flat copper braid of sufficient current carrying capacity (such as the equivalent of No. 14 of solid copper wire) to minimize any loss in the lead-in wires. A suitable solder to connect the lead-in wire to the bus bars is a tin-lead-silver solder containing about 70 percent by weight of lead, about 27 percent by weight of tin and about 3 percent by weight of silver. A suitable commercial embodiment of this solder is sold by the Belmont Smelting and Refining Company of Brooklyn, N. Y. as No. 5701 solder. A suitable flux for the solder is sold under the trade name Nokorode solder paste made by the M. W. Dunton Company of Providence, R. I.

Generally, it is preferred to have the electroconductivity per unit length of the relatively wide, center portions of the bus bars be at least 20 times that of each connecting electroconductive element and that of each end portion of the bus bar to be more than one time but less than 10 times that of each connecting electroconductive element.

The thickness of the bus bars and of the electroconductive elements interconnecting the bus bars is uniform by virtue of the "silk-screening" method of application and generally ranges between 0.0010 inch and 0.0015 inch, depending on the size of window to be coated. For example, in a backlight where the bus bars are separated by 60 inches, the electroconductive elements have a resistance of 0.15 ohms per linear inch and the central portions of the bus bars 3-½ inch long and 1 inch wide have a resistance of 0.0045 ohms per linear inch increasing to a linear bus bar resistance of 0.025 ohms per linear inch at the ¼ inch wide end portions. In a backlight where the bus bars are separated by 45 inches, the electroconductive elements have a resistance of 0.2 ohms per linear inch and the central portions of the bus bars 3-½ inches long and ⅝ inch wide have a resistance of 0.007 ohms per linear inch increasing to a linear bus bar resistance of 0.025 ohms per linear inch at the tapered end portions.

Both of the above examples used a 12-volt battery system to furnish 20 amperes current in the heating circuit. It is understood that the conductivity of the ceramic-silver composition can be controlled by changing the proportion of silver.

The embodiments described above have provided suitable heating circuits for backlights for automobiles which provide a vision area in the center portion of said backlights in a reasonable time without requiring anything more than the electric power of the present conventional automobile battery system to produce the same results.

The form of the invention shown and described above represents an illustrative preferred embodiment and certain modifications thereof. It is understood that various changes may be made without departing from the spirit of the invention as defined in the claimed subject matter that follows:

1. A window comprising a transparent sheet of glass having a pair of bus bars disposed adjacent to a pair of opposite end edges of said glass sheet, each bus bar extending from one end portion thereof near one side of said glass sheet through a center portion thereof to another end portion thereof near the opposite side of said glass sheet, said bus bars tapering in width from their central portions to their end portions, and spaced electroconductive members interconnected between said bus bars, said bus bars and said spaced electroconductive members being rigidly attached to a surface of said glass sheet to form a heating circuit for said window, with certain of said electroconductive members interconnecting the respective central portions of said bus bars, other of said electroconductive members interconnecting one end portion of one of said pair of bus bars toward one side of said window to a corresponding end portion of the other of said pair of bus bars toward said one side and still other electroconductive members interconnecting the other end portion of said one of said pair of bus bars toward the other side of said window to the corresponding other end portion of the other of said pair of bus bars toward said other side, said bus bars and said electroconductive members being of approximately uniform thickness throughout their length, the electroconductivity per unit length of said bus bars in said central portions being at least 20 times that of each of said electroconductive members and the electroconductivity per unit length of said end portions of said bus bars being more than 1 time but less than 10 times that of each of said electroconductive members, and means disposed in approximately the longitudinal center of each of said bus bar central portions adapted to connect said bus bars to a source of power.

2. The improvement as in claim 1, wherein said last named means is located approximately equidistant from a centrally disposed pair of adjacent of said electroconductive members interconnecting said respective central portions of said bus bars.

3. The improvement according to claim 1 wherein said bus bars have straight parallel inner longitudinal edges spaced from and facing toward one another.

4. The improvement as in claim 1 wherein said bus bars have parallel straight outer longitudinal edges facing away from one another.

5. The improvement as in claim 1 whereby said bus bars and said electroconductive members are composed of an electroconductive ceramic silver composition.

6. The improvement according to claim 5 wherein said bus bars and said electroconductive members of said ceramic silver composition are rigidly attached to a surface of said glass sheet by fusion.

7. The improvement according to claim 6 wherein the surface of said window to which said bus bars and electroconductive members are fused is an inward facing surface of said window when installed in a vehicle.

8. The improvement according to claim 7, wherein said window is curved to have an outward facing convex surface and an inward facing concave surface.

* * * * *